(12) United States Patent
Wilson-Jones et al.

(10) Patent No.: US 12,325,473 B2
(45) Date of Patent: Jun. 10, 2025

(54) DUAL MOTOR DRIVE ASSEMBLY

(71) Applicant: ZF Automotive UK Limited, Solihull (GB)

(72) Inventors: Russell Wilson-Jones, Stratford upon Avon (GB); Aleksejs Semjonovs, Snohomish, WA (US); Christos Prevezianos, Birmingham (GB); David Julian Moule, Birmingham (GB)

(73) Assignee: ZF Automotive UK Limited

( * ) Notice: Subject to any disclaimer, the term of this patent is extended or adjusted under 35 U.S.C. 154(b) by 140 days.

(21) Appl. No.: 18/364,832

(22) Filed: Aug. 3, 2023

(65) Prior Publication Data
US 2024/0051595 A1 Feb. 15, 2024

(30) Foreign Application Priority Data

Aug. 9, 2022 (GB) ..................................... 2211652

(51) Int. Cl.
 *B62D 5/04* (2006.01)
 *B62D 5/00* (2006.01)
(52) U.S. Cl.
 CPC ................... *B62D 5/006* (2013.01)
(58) Field of Classification Search
 CPC .......... B62D 5/04; B62D 5/0463; H02P 5/747
 See application file for complete search history.

(56) References Cited

U.S. PATENT DOCUMENTS

| 6,345,681 | B1 | 2/2002 | Hackl et al. | |
| 6,776,252 | B1 * | 8/2004 | Andonian | B62D 5/003 180/402 |
| 6,913,106 | B2 * | 7/2005 | Katou | B62D 5/003 180/407 |
| 2006/0278466 | A1 * | 12/2006 | Cheng | B62D 5/046 180/444 |
| 2007/0205041 | A1 * | 9/2007 | Nishizaki | B62D 5/0472 180/446 |

(Continued)

FOREIGN PATENT DOCUMENTS

JP 2021120236 A 8/2021

*Primary Examiner* — Long T Tran
(74) *Attorney, Agent, or Firm* — Kristin L. Murphy

(57) ABSTRACT

A dual motor drive assembly comprising a housing, a shaft rotatably mounted to the housing, a first gear rotatably connected to the shaft, first and second motors, each having an output driving a respective output gear, the output gears being engaged with the first gear, a torque allocation arrangement for allocating torque demands to each of the first and second motors, a measurement arrangement for measuring first and second temperature relating to the first and second motors respectively, a torque limit allocation arrangement for allocating a maximum torque limit based on the first and second temperature respectively, wherein a maximum total torque is equal to the sum of maximum torque limits of the first and second motors, wherein in a first mode the allocated torque demand to each of the motors is to provide opposing torques to the shaft, and in a second mode to provide torques in the same direction to the shaft, wherein the torque demand allocations change from the first mode to the second mode at a threshold total torque value, and the threshold total torque value is adjustable based on the maximum total torque.

16 Claims, 9 Drawing Sheets

(56) References Cited

U.S. PATENT DOCUMENTS

| | | | |
|---|---|---|---|
| 2013/0030653 A1* | 1/2013 | Soos | B62D 15/0235 |
| | | | 701/41 |
| 2017/0023114 A1* | 1/2017 | Wang | B60K 1/00 |
| 2017/0163203 A1 | 6/2017 | Hambloch et al. | |
| 2018/0297629 A1* | 10/2018 | Wang | B62D 5/046 |
| 2020/0070833 A1* | 3/2020 | Suzuki | B62D 11/24 |
| 2020/0207408 A1* | 7/2020 | Nakamura | B62D 5/049 |
| 2020/0255054 A1 | 8/2020 | Friedel et al. | |
| 2020/0343849 A1* | 10/2020 | Coroban-Schramel | |
| | | | H02P 29/02 |
| 2020/0391790 A1* | 12/2020 | Kamemura | B62D 5/006 |
| 2022/0315099 A1* | 10/2022 | Maegawa | H02P 29/028 |

* cited by examiner

DUAL MOTOR DRIVE ASSEMBLY

CROSS-REFERENCE TO RELATED APPLICATION

This application claims priority to GB Priority Application No. 2211652.9, filed Aug. 9, 2022, the disclosure of which is incorporated herein by reference in its entirety.

TECHNICAL FIELD

This disclosure relates to a dual motor drive assembly, for example, but not exclusively, suitable for use in a handwheel actuator (HWA) assembly of a vehicle.

BACKGROUND

Electric motors are widely used and are increasingly common in automotive applications. For example, it is known to provide an electrically power assisted steering system in which an electric motor apparatus applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

Another example of use of electric motors in automotive applications in in steer-by-wire systems. During normal use, these systems have no direct mechanical link from the hand wheel that the driver grips and the steered wheels with movement of the hand wheel by the driver being detected by a sensor and the motor being driven in response to the output of the sensor to generate a force that steers the road wheels. These systems rely on sensors to relay user input data at a steering wheel to control units which integrate user input data with other information such as vehicle speed and yaw rate, to deliver control signals to a primary motor that physically actuates a steering rack of the vehicle. The control units also act to filter out unwanted feedback from the front wheels and provide a response signal to a secondary electric motor at the steering wheel. The secondary motor provides the driver with the appropriate resistance and feedback in response to specific user inputs at the steering wheel to mimic the feel of a conventional steering system.

In a steer-by-wire system, a malfunction or failure of a portion of the assembly may impair the ability to steer the vehicle. As a result, it is desirable to provide the secondary assembly with a structure for providing at least temporary fail-safe operation. US 2006/0042858 A1 discloses steering apparatus including a steering assembly that includes a handwheel actuator. The handwheel actuator includes a steering column for supporting a steering wheel, a gear mechanism and two motors, each for providing a torque to the steering column.

GB 2579374 A discloses a steering column assembly for use with a steer-by-wire hand wheel actuator. This assembly utilises a similar dual motor drive system that comprises first and second motors, each having an output driving a respective output gear. Each output gear drives a first gear which is connected to and configured to rotate a shaft of the steering wheel to provide a sensation of road feel to the driver. The dual motor drive system is used to reduce gear rattle by driving both motors at the same time to apply opposing torques to the steering column. Having two motors also provides for some redundancy in the system.

Over-heating of components may lead to damage and/or reduced performance. A baseline motor control strategy may typically include thermal management for each lane. This typically measures or estimates the temperature of the parts of the system that get hot and applies a limit to reduce the motor torque demand or motor current demand to prevent over-heating.

The temperature estimates can be obtained by incorporating measurements of temperature in some location with a model of the effect of motor current, motor phase current or supply current. Typically, the thermal estimators are designed to allow protection of parts of the system (usually ECU or motor) that are the first to reach their maximum allowed temperature.

In addition to motor thermal limits there are also limits for supply voltage, system states and other operating conditions. It will be appreciated that motor torque demand may be easily translated to motor current as motor current is more directly associated with motor heating.

A limit can be applied to motor current, motor torque or electronic drive stage (inverter) input current (i.e. current drawn from the battery). There are two general methods of reducing the motor output:

(1) Limit (reduce) the output by reducing the avowed maximum demanded motor torque/current/output; and
(2) Applying a gain to reduce the demanded motor torque/current/output.

Limiting one motor output by reducing the gain is not desirable because it distorts the overall output. To implement a gain-based output reduction it is better to apply the same gain to both of the motors, but if only one motor needs to be limited then this gives a premature reduction in system output. Therefore it may be desirable to have a strategy that can work when one motor is limited by more than another.

SUMMARY

The present disclosure seeks to ameliorate the problems associated with conventional motor assemblies.

In accordance with a first aspect of the present disclosure, a dual motor drive assembly comprises:
  a housing;
  a shaft rotatably mounted with respect to the housing;
  a first gear connected to and configured to rotate with the shaft;
  first and second motors, each having an output driving a respective output gear, the output gears being engaged with the first gear;
  a torque allocation arrangement for allocating torque demands to each of the first and second motors;
  a measurement arrangement for measuring or estimating a first temperature and a second temperature relating to the first and second motors respectively;
  a limit allocation arrangement for allocating a maximum torque limit to the first and second motors based on the first temperature and the second temperature respectively, wherein a maximum total torque is equal to the sum of the maximum torque limits of the first and second motors;
  wherein in a first mode the torque demand allocated to each of the motors is such that the motors are providing opposing torques to the shaft, and in a second mode the torque demand allocated to each of the motors is such that the motors are providing torques in the same direction to the shaft;

wherein the torque demand allocations change from the first mode to the second mode at a threshold total torque value; and wherein the threshold total torque value is adjusted based on the maximum total torque.

The torque allocation arrangement for allocating torque demands may be configured to allocate torque demands to the motors according to a baseline allocation scheme when the measured or estimated first temperature and second temperature are approximately equal, or when both temperatures are below a pre-determined temperature limit. The threshold total torque value may be adjusted relative to the baseline allocation scheme in order to minimise the torque output from the motor associated with the higher temperature.

The threshold total torque value may be adjusted such that the dual motor drive assembly switches from the first mode to the second mode at a lower threshold total torque value when a measured or estimated temperature exceeds a pre-determined limit, or when a measured or estimated temperature associated with one motor exceeds a measured or estimated temperature associated with the other motor.

When a temperature associated with a motor exceeds a pre-determined limit, a reduced maximum torque limit may be applied to that motor.

In this way, the motor associated with the lower temperature may switch from providing an opposing offset torque to providing a torque in the same direction as the motor associated with the higher temperature at a lower total torque. As such, higher total torques may be provided where the motor associated with the higher temperature individually provides a lower torque output compared to a baseline torque allocation scheme.

Under normal operating conditions both motors may be assigned substantially equal maximum torque limits. Under normal operating conditions, the torque allocations may follow a baseline torque allocation scheme.

The baseline torque allocation scheme may comprise a threshold total torque value wherein the torque allocations change from the first mode to the second mode. The threshold total torque may be a relative percentage of the maximum total torque. For example, the threshold total torque may be approximately 50% of the maximum total torque.

The net torque provided by the first and second motors in either a clockwise or counter clockwise direction may be described as a positive and negative net torque.

In the first mode, for example, the second motor may be allocated an offset torque while the first motor may be allocated a torque demand for meeting the total torque demand in a positive direction. In the first mode, for example, the first motor may be allocated an offset torque while the second motor may be allocated a torque demand for meeting the total torque demand in a negative direction. The torque demand allocated to the second motor may be the sum of the total torque demand (negative) and an equal and opposite offset torque (negative) to the offset torque allocated to the first motor (positive). In this way the provision or magnitude of the offset torques to the first and second motors does not vary the net torque.

In an example scenario, the first temperature associated with the first motor may be higher than the second temperature associated with the second motor. The first temperature may be high enough that a reduced maximum torque limit is applied to the first motor in order to prevent further over heating and damage.

As noted above, in the first mode, the second motor may be allocated an offset torque while the first motor may be allocated a torque demand for meeting the total torque demand in a positive direction. In accordance with an example baseline torque allocation scheme, the threshold total torque may be approximately 50% of the maximum total torque. As such, when there is a torque demand of approximately 50% or higher of the maximum total torque the dual motor assembly will switch from the first mode to the second mode, and the second motor will change from providing an offset torque to providing a torque in the same positive direction as the first motor.

When a reduced maximum torque limit is applied to the first motor, the maximum total torque output of the dual motor assembly may be reduced by any suitable amount. For example, the maximum total torque output may be reduced to the sum of the maximum torque limits of the second motor and the reduced maximum torque limit of the first motor. The threshold total torque may be reduced to a value that is equal or lower than the reduced maximum torque limit of first motor.

In this way, the second motor will change from providing an offset torque to providing a torque in the same positive direction as the first motor at a lower total torque demand, thereby minimising further over heating of the first motor.

At the same time, the threshold total torque value may not change in the negative torque direction. Even though the maximum total torque may be reduced, the threshold total torque in the negative torque direction may remain unchanged. In this way, the first motor may continue to provide only a small offset torque while the second motor provides the total torque demand in the negative direction up to an unchanged threshold torque demand. In this way, the torque demand of the first motor is minimised in the negative direction.

By adjusting the threshold torque demand in the positive torque direction but maintaining the original threshold torque demand in the negative direction, the second motor can be used to contribute more torque to the total torque output in both torque directions and therefore minimise the heating of the first motor. The same may be applied vice versa where the reverse situation in terms of motor temperatures applies.

In examples, the threshold total torque may be any suitable percentage of the maximum total torque. A linear reduction in maximum total torque may cause a linear reduction in threshold total torque.

As the maximum torque of one of the first or second motors is reduced, the maximum total torque is reduced, the threshold total torque may be reduced such that the operation changes from the first operating mode to the second operating mode at or before the point at which the one of the first and second motor reaches its reduced maximum output. In this way, the threshold total torque may be adjusted to a lower relative percentage. For example, if the maximum total torque is reduced from 100% to 90%, the threshold total torque may be reduced from 50% to 40%. Any other suitable reductions may be applied.

It will be appreciated that the above description may equally apply in reverse to a scenario where the second temperature associated with the second motor is higher than the first temperature associated with the first motor, or in the case in which both motors are limited and the threshold torque demand is reduced in both positive and negative directions.

Advantageously by adjusting the threshold torque demand, the torque demand allocated to the motor associated with the higher temperatures can be minimised to limit additional heating. By adjusting the bias of the threshold torque demand, the heating of the motors can be more evenly distributed.

In the second mode, the torque allocation arrangement for allocating torque demands to each of the first and second motors may be configured such that the torque demands to both the first and second motors reach their respective maximum torque limits when the total torque demand reaches the maximum limit. In this way, both motors may only be working at their respective maximum torque outputs when the maximum total torque demand is required. As such, the time spent at a maximum torque output is minimised, thereby reducing heating and high torque events within the assembly.

As the maximum torque limit to the first and second motors is based on the first temperature and the second temperature respectively and the threshold total torque value is adjusted based on the maximum total torque, the torque allocation arrangement may be configured to adjust the torque demands dependent on the threshold torque value and the maximum total torque such that both the first and second motors reach their respective maximum torque limits when the total torque demand reaches the maximum limit.

In accordance with a second aspect of the present disclosure there is provided a method of operating a dual motor drive assembly, the dual motor assembly comprising:
  a housing; a shaft rotatably mounted with respect to the housing; a first gear connected to and configured to rotate with the shaft; first and second motors, each having an output driving a respective output gear, the output gears being engaged with the first gear;
  wherein the method comprises the steps:
  (a) allocating torque demands to each of the first and second motors, wherein in a first mode the torque demand allocated to each of the motors is such that the motors are providing opposing torques to the shaft, and in a second mode the torque demand allocated to each of the motors is such that the motors are providing torques in the same direction to the shaft;
  (b) measuring or estimating a first temperature and a second temperature relating to the first and second motors respectively;
  (c) allocating a maximum torque limit to the first and second motors based on the first temperature and the second temperature respectively, wherein a maximum total torque is equal to the sum of the maximum torque limits of the first and second motors; and
  (d) changing from the first mode to the second mode at a threshold total torque value, wherein the threshold total torque value is adjusted based on the maximum total torque Each of the features described in relation to the first aspect of the disclosure may apply equally to the second aspect of the disclosure.

In accordance with a third aspect of the present disclosure, a dual motor drive assembly comprises:
  a housing;
  a shaft rotatably mounted with respect to the housing;
  a first gear connected to and configured to rotate with the shaft;
  first and second motors, each having an output driving a respective output gear, the output gears being engaged with the first gear;
  a torque allocation arrangement for allocating torque demands to each of the first and second motors;
  a measurement arrangement for measuring or estimating a first temperature and a second temperature relating to the first and second motors respectively;
  wherein in a first mode the torque demand allocated to each of the motors is such that the motors are providing opposing torques to the shaft, and in a second mode the torque demand allocated to each of the motors is such that the motors are providing torques in the same direction to the shaft; and
  wherein in the second mode, the first and second temperatures are compared to each other and/or to one or more pre-determined limits, and the torque demand allocated to each motor is adjusted based on the comparison so as to balance the temperature of the first and second motors.

Under normal operating conditions, the torque demand allocations may follow a baseline torque allocation scheme. The torque allocation arrangement may allocate any suitable torque demand to each of the first and second motors for any given total torque demand.

The first temperature and second temperature may be measured or estimated for any suitable part or component of the assembly, for example a component that typically reaches higher temperatures that could lead to heating damage.

The first and second temperatures may be compared to one or more pre-determined limits. If neither the first and second temperatures exceed a pre-determined limit, the torque allocation arrangement may follow the baseline torque allocation scheme.

If either the first and second temperatures exceed a pre-determined limit, both temperatures may be compared. If both the first and second temperatures exceed a pre-determined limit, both temperatures may be compared.

If the comparison measures the first temperature relating to the first motor to be higher than the second temperature relating to the second motor, then for a given total torque demand in the second mode a higher torque demand may be allocated to the second motor and a lower torque demand may be allocated to the first motor, in comparison to the baseline torque allocation scheme. In this way, demand torques to the first and second motors may be allocated to balance the first and second temperatures in proportion to a temperature difference between the first and second temperatures.

The reverse may equally apply if the second temperature relating to the second motor is higher than the first temperature. In this way a smaller torque demand may be allocated to a motor where the measured or estimated temperature is higher than the other motor to meet a total torque demand, in comparison to a baseline torque allocation scheme that is applied both temperatures are equal.

If one of the first and second temperatures exceed a pre-determined limit, then in the second mode the torque demand allocated to each motor may be adjusted to balance the temperature of the first and second motors. For example, if the first temperature relating to the first motor exceeds a pre-determined limit and the second temperature does not exceed a pre-determined limit, then for a given total torque demand a higher torque demand may be allocated to the second motor and a lower torque demand may be allocated to the first motor, in comparison to the baseline torque allocation scheme. The reverse may equally apply if the second temperature relating to the second motor exceeds a pre-determined limit and the first temperature does not exceed a pre-determined limit. In this way a smaller torque demand may be allocated to a motor where a temperature exceeds a pre-determined limit to meet a total torque demand, hi comparison to a baseline torque allocation scheme that is applied both temperatures are within acceptable limits.

In accordance with a fourth aspect of the present disclosure there is provided a method of operating a dual motor drive assembly, the dual motor assembly comprising:
- a housing; a shaft rotatably mounted with respect to the housing; a first gear connected to and configured to rotate with the shaft; first and second motors, each having an output driving a respective output gear, the output gears being engaged with the first gear;
- wherein the method comprises the steps:
  (a) allocating torque demands to each of the first and second motors; wherein in a first mode the torque demand allocated to each of the motors is such that the motors are providing opposing torques to the shaft, and in a second mode the torque demand allocated to each of the motors is such that the motors are providing torques in the same direction to the shaft;
  (b) measuring or estimating a first temperature and a second temperature relating to the first and second motors respectively;
  (c) comparing the first and second temperatures in the second mode, and adjusting the torque demand allocated to each motor based on the comparison so as to balance the temperature of the first and second motors.

Step (c) may include adjusting the torques allocated to each motor to balance the first and second temperatures in proportion to a temperature difference between the first and second temperatures.

Each of the features described in relation to the first aspect of the disclosure may apply equally to the second aspect of the disclosure.

Each of the features described in relation to the third aspect of disclosure may apply equally to the fourth aspect of the disclosure.

The person skilled in the art will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DETAILED DESCRIPTION

Figure 1:
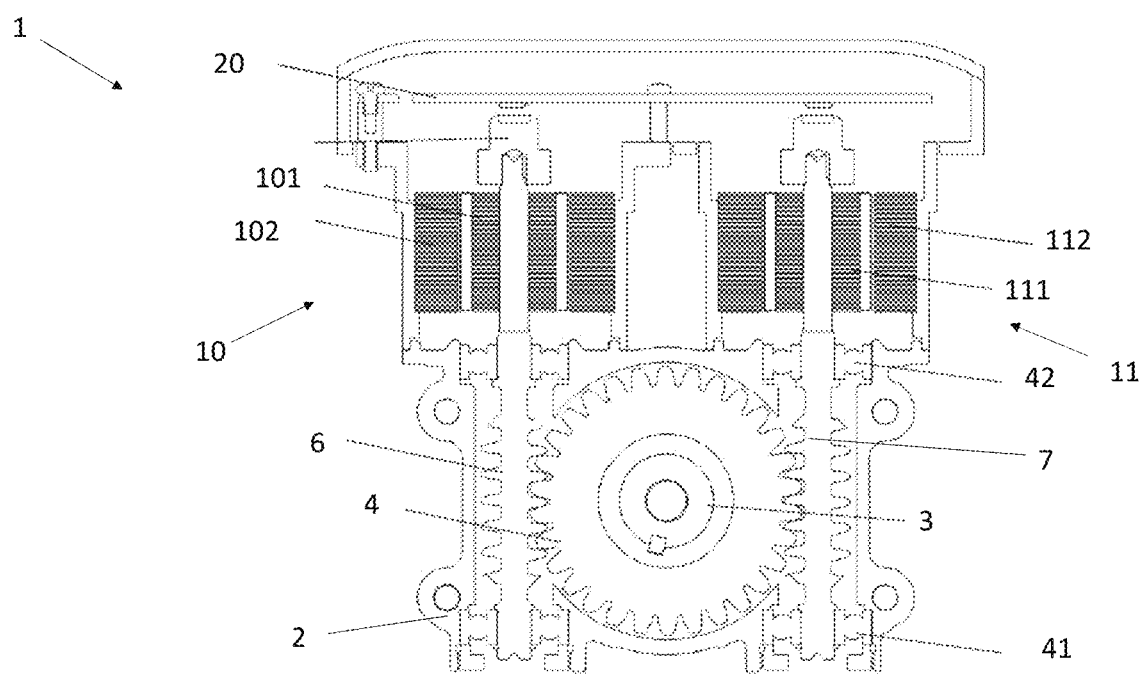
FIG. 1 shows an exemplary arrangement of a dual motor drive assembly according to a first aspect of the disclosure.

FIG. 1 shows a dual motor drive assembly, suitable for use in a handwheel actuator (HWA) assembly of a vehicle, according to a first aspect of the disclosure. The drive assembly 1 includes a first motor 10 with a rotor 101 and stator 102 and a second motor 11 with a rotor 111 and stator 112, the first motor 10 being connected to a first worm gear 6 and the second motor 11 being connected to a second worm gear 7. Each worm gear 6, 7 comprises a threaded shaft arranged to engage with a wormwheel gear 4 connected to a steering column shaft 3 such that torque may be transferred from the worm gears 6, 7 to the wormwheel gear 4 connected to the steering column shaft 3. The wormwheel gear 4 is operatively connected to a driver's steering wheel (not shown) via the steering column shaft 3. In this example, each of the two motors 10, 11 are brushless permanent magnet type motors and each comprise a rotor 101, 111 and a stator 102, 112 having many windings surrounding regularly circumferentially spaced teeth. The arrangement of the two motors 10, 11, the shaft 3, the worm gears 6, 7 and the wheel gear 4 together form a dual motor electrical assembly.

Each of the two motors 10, 11 are controlled by an electronic control unit (ECU) 20. The ECU 20 controls the level of current applied to the windings and hence the level of torque that is produced by each motor 10, 11.

In this example, the two motors 10, 11 are of a similar design and produce a similar level of maximum torque. However, it is within the scope of this disclosure to have an asymmetric design in which one motor 10, 11 produces a higher level of torque than the other 10, 11.

One of the functions of a handwheel actuator (HWA) assembly is to provide a feedback force to the driver to give an appropriate steering feel. This may be achieved by controlling the torque of the motors 10, 11 in accordance with signals from the handwheel actuator (such as column angle) and from other systems in the vehicle (such as vehicle speed, rack angle, lateral acceleration and yaw rate).

The use of two motors 10, 11 is beneficial in eliminating rattle. If a single electric motor were instead used in a torque feedback unit, the motor may be held in locked contact with the gearing by a spring. However, in certain driving conditions the action of a spring is not sufficiently firm, which allows the gears to "rattle" during sinusoidal motions or sharp position changes of the steering column.

Use of two motors 10, 11 which can be actively controlled (as in the present exemplary arrangement) ameliorates the problems associated with use of a single motor. In this arrangement, both motors 10, 11 are controlled by the ECU 20 to provide torque feedback to the steering column and to ensure that the worm gears 6, 7 of both motors 10, 11 are continuously in contact with the wormwheel gear 4, in order to minimise rattle.

As shown in FIG. 1, the motors 10, 11 are received in and secured to a transversely extending two-part extension of a housing 2. The worm gear 6, 7 of each motor is supported relative to the housing by two sets of bearings. A first set of bearings 41 supports an first end of each worm gear 6, 7 distal their respective motor 10, 11 while a second set of bearings 42 supports a second end of each worm gear 6, 7 proximal their respective motor 10, 11.

Figure 2:
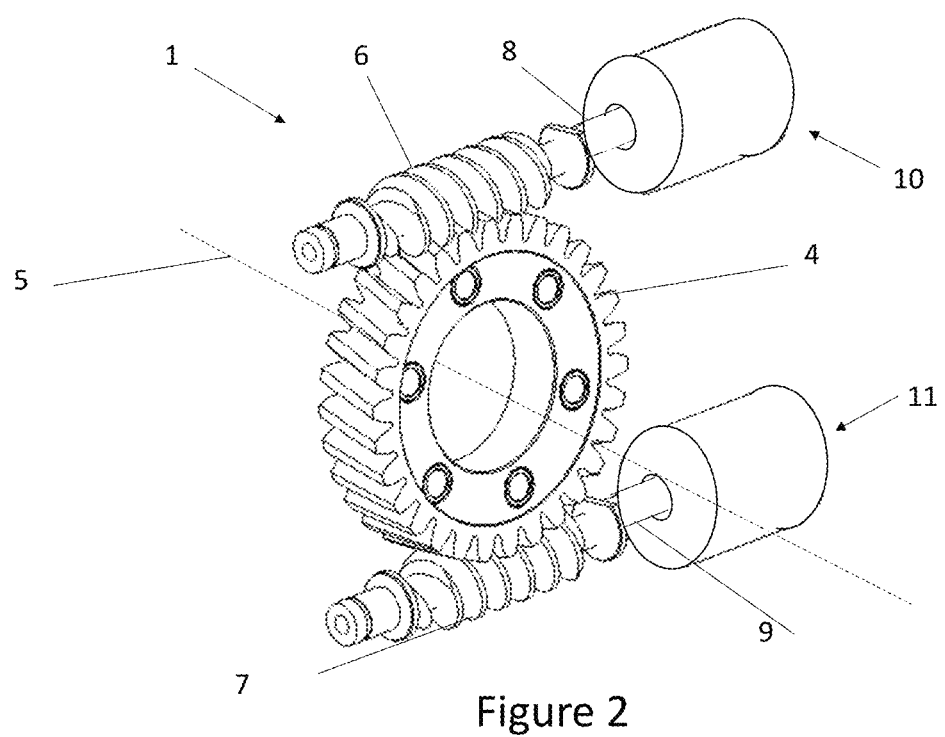
FIG. 2 shows a part of the dual motor drive apparatus of FIG. 1 with the gearbox housing removed to better show the gears and the motor connection to the gears.

As best seen in FIG. 2, the periphery of the wormwheel gear 4 is formed as a worm gear which meshes with each of two identical worm gears 6, 7 located on opposite sides of the longitudinal axis 5 of the shaft 3. The shaft 3 is not shown in FIG. 2 but the axis of rotation of the shaft is marked using a dashed line 5, extending perpendicularly through the wormwheel gear 4. Each worm gear 6, 7 is connected to the output shaft 8, 9 of a respective electric motor 10, 11.

The axes of the output shafts 8, 9 of the two motors 10, 11 are arranged perpendicularly to the rotational axis of the shaft 3 and the axes of the two motors may also be inclined with respect to each other, to reduce the overall size of the assembly.

The motors 10, 11 are controlled by the electronic control unit (ECU) 20 such that at low levels of input torque applied to the shaft 3 by the steering wheel, the motors 10, 11 act in opposite directions on the wormwheel gear 4 to eliminate backlash. At higher levels of input torque applied to the shaft 3 by the steering wheel, the motors 10, 11 act in the same direction on the wormwheel gear 4 to assist in rotation of the shaft 3. Here, a motor 10, 11 acting in 'a direction' is used indicate the direction of torque applied by a motor 10, 11 to the wormwheel gear 4.

In the exemplary arrangement shown in FIGS. 1 and 2, the worm gears 6, 7 engage diametrically opposed portions of a wormwheel gear 4. The threads of the worm gears 6, 7 each have the same sense, i.e., they are both left-handed screw threads in this example. The motors 10, 11 are configured such that they lie on the same side of the wormwheel gear 4 (both motors 10, 11 lie on one side of a virtual plane perpendicular to axes of the worm gears 6, 7 and passing through the centre point of the wormwheel gear 4). Considering as an example the perspective shown in FIG. 2, driving both motors 10, 11 clockwise would apply torque in opposite directions to the wormwheel gear 4, with motor 10 applying a clockwise torque to wormwheel gear 4 and motor 11 applying an opposing anti-clockwise torque to wormwheel gear 4.

Figure 3:
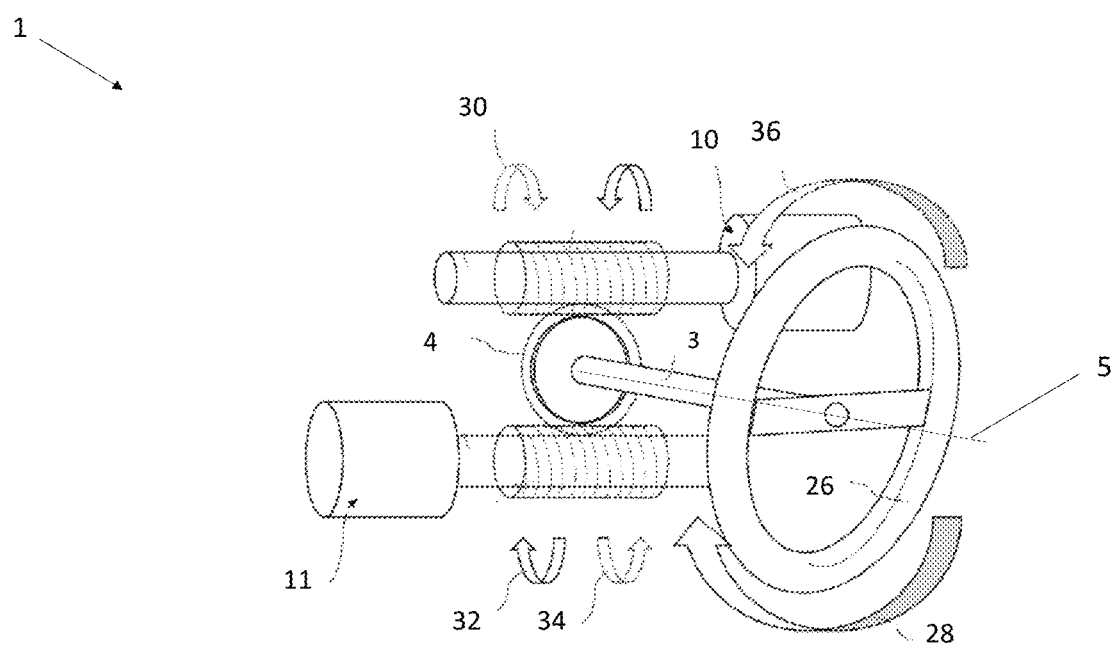
FIG. 3 shows another exemplary arrangement of a dual motor drive assembly according to a first aspect of the disclosure.

FIG. 3 shows another exemplary arrangement of a dual motor drive assembly, substantially similar to the exemplary arrangement shown in FIGS. 1 and 2 but with different motor positioning.

FIG. 3 shows another embodiment of a dual motor drive assembly 1 according to the first aspect of the disclosure. This exemplary arrangement is substantially similar to the exemplary arrangement shown in FIGS. 1 and 2 with the only difference being the positioning of the motors 10, 11. Components and functional units which in terms of function and/or construction are equivalent or identical to those of the preceding exemplary arrangement are provided with the same reference signs and are not separately described. The explanations pertaining to FIG. 1 and FIG. 2 therefore apply in analogous manner to FIG. 3 with the exception of the positioning of the two motors 10, 11.

In FIG. 3 the worm gears 6, 7 engage diametrically opposed portions of a wormwheel gear 4 and threads of the worm gears 6, 7 each have the same sense, i.e., they are both right-handed screw threads in this example. The motors 10, 11 are configured such that they lie on opposing sides of the wormwheel gear 4 (motor 10 lies on one side of a virtual plane perpendicular to axes of the worm gears 6, 7 and passing through the centre point of the wormwheel gear 4 while motor 11 lies on the other side of this virtual plane).

Application of torque by a driver in a clockwise direction indicated by solid arrow 23 results in rotation of the steering wheel 26 and the steering column 3 about the dashed line 5. This rotation is detected by a rotation sensor (not shown).

The first motor 10 is then controlled by the ECU 20 to apply torque in the opposite direction as indicated by dashed arrow 30.

The net result of the torques 30, 32, 34 applied by the first and second motors 10, 11 results in an application of a feedback torque to the steering column 3 and steering wheel 26, generally but not always in the opposite direction to that applied to the steering wheel by the driver, as indicated by a dashed arrow 36, to provide a sensation of road feel to the driver. In this way, the "rattle" produced between the worm gears 6, 7 and the wormwheel gear 4 can be eliminated or significantly reduced.

Figure 4:
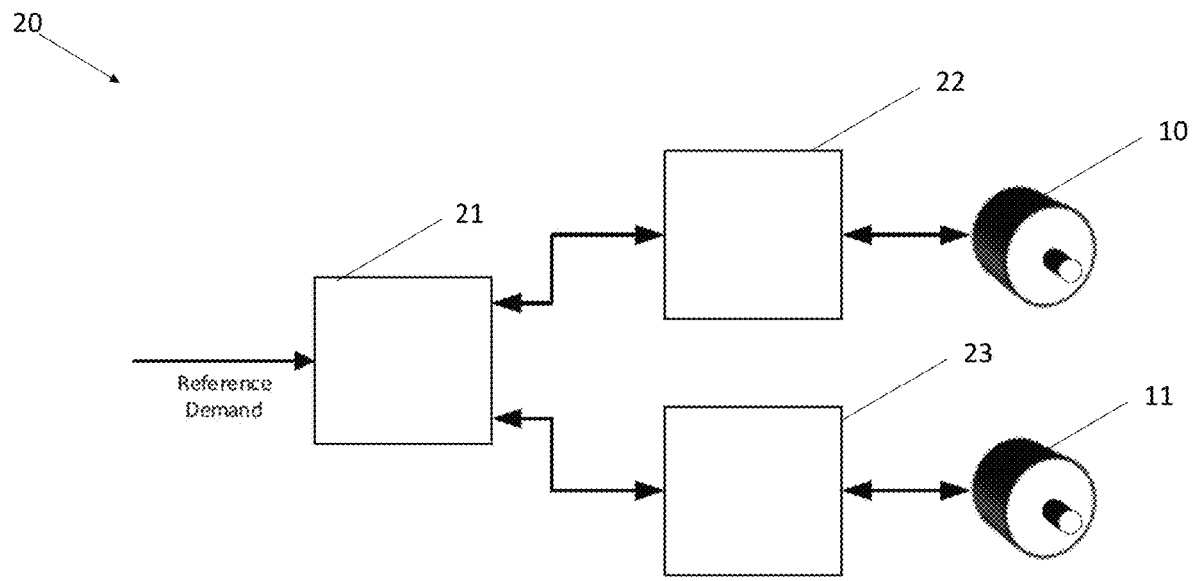
FIG. 4 shows a general arrangement of an electronic control unit which controls the two motors of a dual motor drive assembly according to a first aspect of the disclosure.

FIG. 4 shows part of an HWA assembly (80) showing a general arrangement of an electronic control unit (ECU) 20 which controls each of the two motors 10, 11. The ECU 20 in this example includes a hand wheel actuator (HWA) control system 21 as well as a first and second motor controller 22, 23 which control the first and second motors 10, 11 respectively. The HWA control may be implemented by a separate ECU in other exemplary arrangement. A reference demand signal is input to the HWA control system 21 which allocates torque demands to each of the first and second motors 10, 11. These motor torque demands are converted to motor current demands and transmitted to the first and second motor controllers 22, 23. Each motor 10, 11 provides operating feedback to their respective motor controller 22, 23. In another exemplary arrangement, the HWA control system 21 may be implemented by a separate ECU to the first and second motor controller 22, 23.

Figure 5:
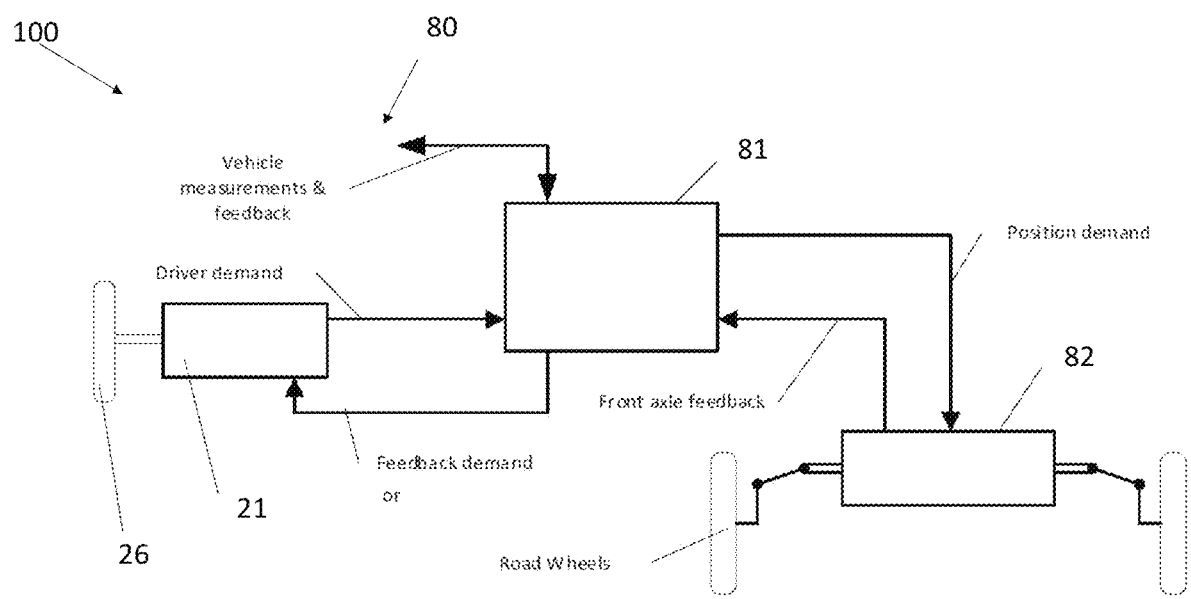
FIG. 5 shows a layout of a Steer-by-Wire system including a dual motor drive assembly according to a first aspect of the disclosure.

FIG. 5 shows an overall layout of a Steer-by-Wire system 100 for a vehicle including handwheel actuator (HWA) assembly 80 using a dual motor drive assembly 1 according to a first aspect of the disclosure. The HWA assembly 80 supports the driver's steering wheel 26 and measures the driver demand which can be the steering angle or steering torque. A steering controller 81 converts the driver demand into a position demand that is sent to a front axle actuator (FAA) 82. The FAA 82 controls the steering angle of the roadwheels to achieve the position demand. The FAA 82 can feedback operating states and measurements to the steering controller 81.

The steering controller 81 combines the FAA 82 feedback with other information measured in the vehicle, such as lateral acceleration and vehicle speed, to determine a target feedback torque that should be sensed by a driver of the vehicle. This feedback demand is then sent to the HWA control system 21 and is provided by controlling the first and second motors 10, 11 with the first and second motor controllers 22, 23 respectively.

FIG. 5 shows the steering controller 81 as physically separate to both the HWA controller 21 and the FAA 82. Alternately, different architectures, where one or more of these components are physically interconnected, may be used within the scope of this disclosure. For example, the functions of the steering controller 81 may be physically implemented in the HWA controller 21, the FAA 82, or another control unit in the vehicle, or some combination of all 3. Alternatively, control functions ascribed to the HWA controller 21 and FAA 82 may be partially or totally implemented in the steering controller 81.

Figure 6:
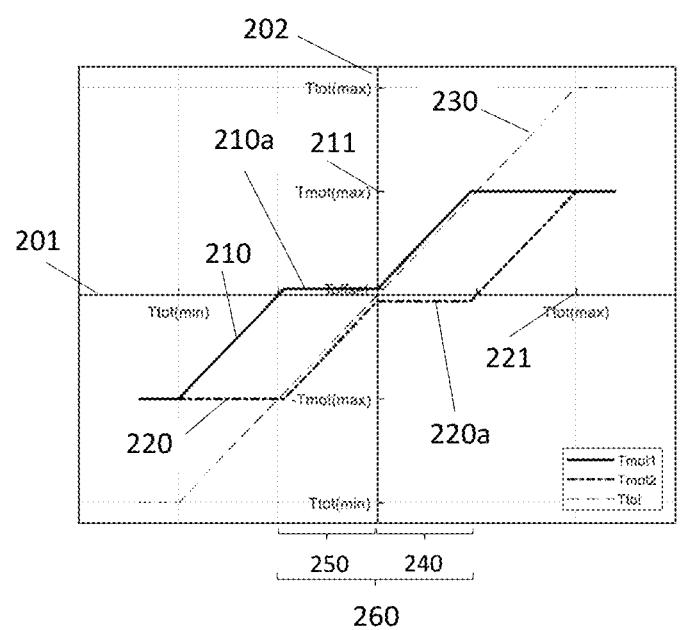
FIG. 6 shows a baseline torque allocation scheme.

The relationship between the total torque demanded to provide feedback to the driver (x-axis) 201 and the feedback torque applied (y-axis) 202 for a baseline torque allocation scheme is shown in FIG. 6.

Solid line 210 represents the torque applied by the first motor 10 while dashed line 220 represents the torque applied by the second motor 11. The net torque applied by the two motors is represented by dashed line 230. In a first torque range 240 where the torque demand is positive, the first motor 10 applies a torque shown by solid line 210 to provide feedback to the steering column shaft 3 and steering wheel 26, while the second motor 11 applies a smaller magnitude torque known as an "offset torque" in the opposite direction to eliminate or reduce transmission rattle. The roles of the motors 10, 11 change depending in which direction the driver is steering. In a second torque range 250 where the torque demand is negative, the second motor 11 applies a feedback torque 220 to the steering column shaft 3 and the first motor 10 applies a smaller magnitude "offset" torque in the opposite direction.

The offset torque 210a applied by the first motor 10 is indicated by the constant low torque region located within the second torque range 250.

The offset torque 220a applied by the second motor 11 is indicated by the constant low torque region located within the first torque range 240.

Together, the first torque range 240 and second torque range 250 extend across a first mode torque range 260.

In the low torque regions 240, 250 the means for allocating torque demands to each of the first and second motors 10, 11 is allocating torque according to a first mode. In this first mode the torque demands allocated to the first and second motors 10, 11 is such that each output worm gear 6, 7 applies an opposing torque to the wormwheel gear 4, in order to control mechanical backlash.

It can be seen in FIG. 6 that as the total torque demanded increases from zero, in the positive torque demand direction, the first motor 10 provides an increasing torque 210 until a maximum output 211 for the first motor 10 is reached. As the total torque demanded further increases, the applied torque 220 provided by the second motor 11 increases such that both motors 10, 11 are applying a torque in the same direction (e.g., positive in the top right quadrant) to the first wormwheel gear 4, The net torque 230 applied by the two motors 10, 11 can be seen to increase at a constant rate from zero until a maximum output 221 for the second motor 11 is reached, at which point both the first and second motors have reached their maximum output torques 211, 221.

When operating in the second mode, both motors 10, 11 are providing torque in the same direction.

Figure 7:
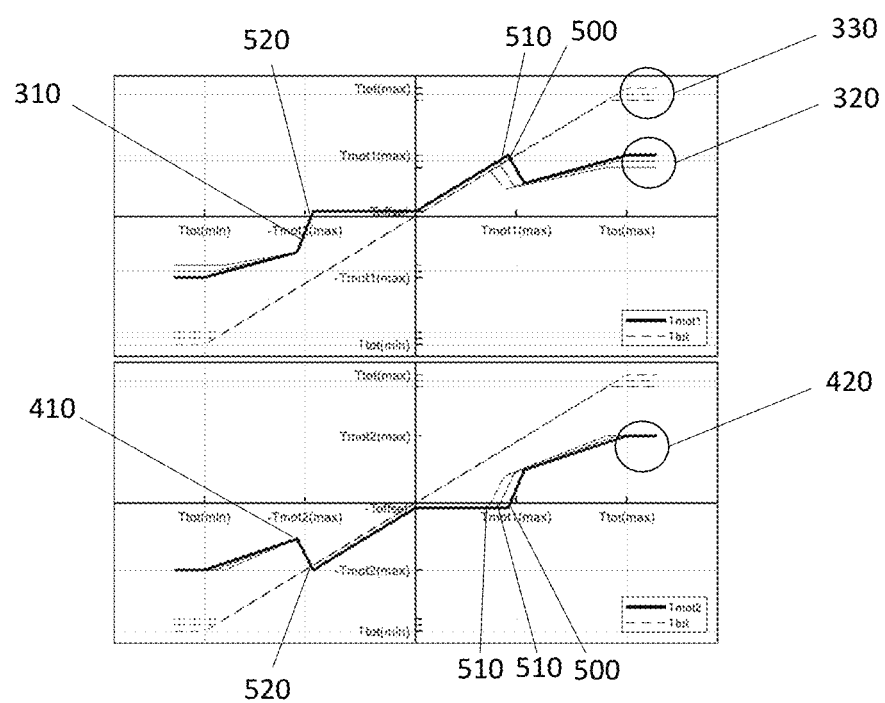
FIG. 7 shows an example torque allocation scheme.

FIG. 7 shows an example torque allocation scheme where in a first mode the torque demand allocated to each of the motors is such that the motors are providing opposing torques to the shaft, and in a second mode the torque demand allocated to each of the motors is such that the motors are providing torques in the same direction to the shaft; wherein the torque allocations change from the first mode to the second mode at a threshold total torque value; wherein the threshold total torque value is adjusted based on the maximum total torque.

A first solid line 310 represents the torque demand allocated to the first motor 10 in accordance with a baseline torque allocation scheme.

A second solid line 410 represents the torque demand allocated to the second motor 11 in accordance with a baseline torque allocation scheme.

It can be seen that within a low torque range, one of the motors is configured to provide a small offset torque whilst the other motor is configured to provide a torque to meet the total torque demand.

At a threshold total torque value, the motor providing the offset torque switches over to provide a torque in the same direction as the other motor. In the example shown in FIG. 7, the threshold torque value is approximately 50% of the maximum total torque.

FIG. 7 also shows adjusted allocated torques when operating in the second mode relative to the baseline allocated torques 310, 410.

In a first set of example scenarios, a measured or estimated temperature indicates that the first motor 10 is running hotter than the second motor 11. As a result of this, a reduced maximum torque limit 320 is applied to the first motor 10. The maximum torque of the second motor 11 remains unchanged. As a result of the limited first motor, the total torque 330 of the assembly is reduced. The second motor 11 is not limited as shown by the maximum torque 420.

In the baseline torque allocations, the threshold total torque 500 is indicated on both graphs at the point where the operation switched from the first to the second mode. The threshold total torque value is adjusted relative to the baseline allocation scheme in order to minimise the torque output from the first motor associated with the higher temperature, in this example. As shown, reduced threshold total torque values 510 are used such that the cross over to the second mode occurs at a lower total torque demand.

In the first mode in the negative torque direction the first motor 10, in this example the hotter and torque limited motor, provides an offset torque while the second motor 11 provides a torque to meet the total torque demand. When a torque limit is applied to the first motor 10, in the negative torque direction the threshold total torque value 520 does not change. In this way higher output torques are provided by the second motor and the first motor associated with the higher temperature individually provides a lower torque output compared to a baseline torque allocation scheme.

Figure 8:
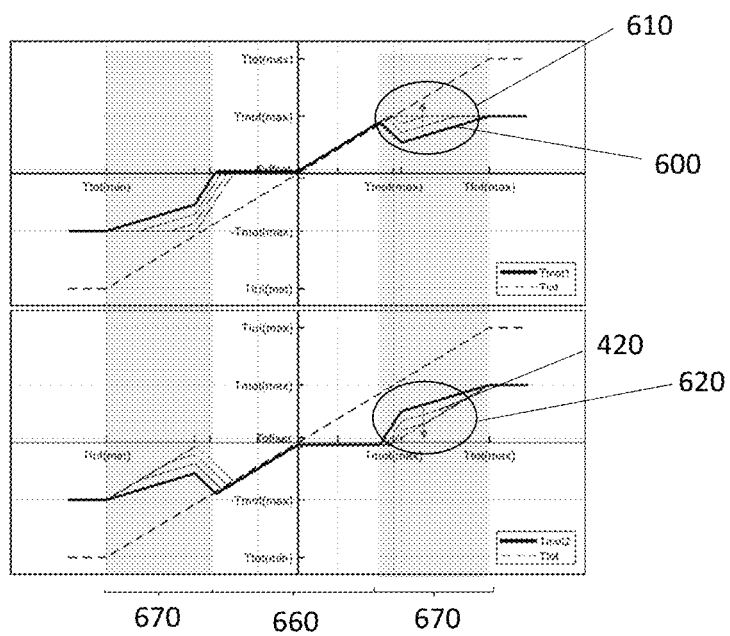
FIG. 8 shows example torque allocations for scenarios where the first motor 10 has a measured or estimated temperature that is higher than the second motor.

FIG. 8 shows example torque demand allocations for scenarios where the second motor 11 has a measured or estimated temperature that is higher than the first motor, compared to a baseline torque allocation.

In a first mode 660 the torque demand allocated to each of the motors is such that the motors are providing opposing torques to the shaft. In a second mode 670 the torque demand allocated to each of the motors is such that the motors are providing torques in the same direction to the shaft. The baseline torque allocations are shown by the solid line 600.

In the second mode, the first and second temperatures are compared to each other and/or to one or more pre-determined limits, and the torque demands allocated to each motor is adjusted based on the comparison so as to balance the temperature of the first and second motors.

In the example shown in FIG. 8, the first temperature relating to the first motor is lower than the second temperature relating to the second motor. Therefore, then for a given total torque demand in the second mode a higher torque demand is allocated to the first motor and a lower torque demand is allocated to the second motor. This is shown by region 610 for the first motor 10 and 620 for the second motor 11. The torque allocation can be changed in a progressive gradual manner.

In this way a smaller torque demand is allocated to a motor where the measured or estimated temperature is higher than the other motor to meet a total torque demand, in comparison to a baseline torque allocation scheme that is applied both temperatures are equal.

Figure 9:
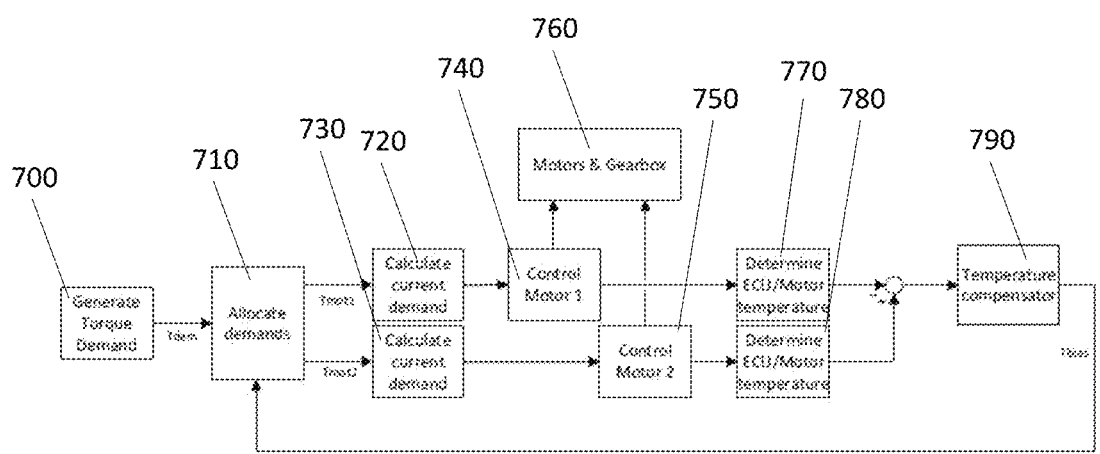
FIG. 9 shows a schematic representation of an example arrangement for allocating torque demands in accordance with aspects of the disclosure.

FIG. 9 shows a schematic representation of an example arrangement for allocating torque demands in accordance with aspects of the disclosure.

A total torque demand 700 may be generated, followed by the allocation 710 of torque demands. These may be converted into a first torque demand 720 and second torque demand 730 for the first and second motors respectively.

A controller for controlling each motor 740, 750 may be provided and operable to control operation of the motors 760.

The first temperature 770 and second temperature 780 are measured or estimated. A temperature compensator 790 is then operable to adjust the torque threshold, apply torque limits to the motors or proportionally vary the torque allocation in mode 2.

It will be understood that the disclosure is not limited to the exemplary arrangements above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A dual motor drive assembly comprising:
    a housing;
    a shaft rotatably mounted with respect to the housing;
    a first gear connected to and configured to rotate with the shaft;
    first and second motors, each having an output driving a respective output gear, the output gears being engaged with the first gear;
    a torque allocation arrangement for allocating torque demands to each of the first and second motors;
    a measurement arrangement for measuring or estimating a first temperature and a second temperature relating to the first and second motors respectively;
    a maximum torque allocation arrangement for allocating a maximum torque limit to the first and second motors based on the first temperature and the second temperature respectively, wherein the maximum total torque is equal to the sum of the maximum torque limits of the first and second motors;
    wherein in a first mode the torque demand allocated to each of the motors is such that the motors are providing opposing torques to the shaft, and in a second mode the torque demand allocated to each of the motors is such that the motors are providing torques in the same direction to the shaft;
    wherein the torque demand allocations change from the first mode to the second mode at a threshold total torque value; and
    wherein the threshold total torque value is adjusted based on the maximum total torque.

2. A dual motor drive assembly according to claim 1, wherein the torque allocation arrangement is configured to allocate torque demands to the motors according to a baseline allocation scheme when the measured or estimated first temperature and second temperature are approximately equal, or when both temperatures are below a pre-determined temperature limit.

3. A dual motor drive assembly according to claim 1, wherein the threshold total torque value is adjusted such that the dual motor drive assembly switches from the first mode to the second mode at a lower threshold total torque value when a measured or estimated temperature exceeds a pre-determined limit, or when a measured or estimated temperature associated with one motor exceeds a measured or estimated temperature associated with the other motor.

4. A dual motor drive assembly according to claim 3 wherein the motor associated with the lower temperature switches from providing an opposing offset torque to providing a torque in the same direction as the motor associated with the higher temperature at a lower total torque demand.

5. A dual motor drive assembly according to claim 1, wherein when a temperature associated with a motor exceeds a pre-determined limit, a reduced maximum torque limit may be applied to that motor.

6. A dual motor drive assembly according to claim 1, wherein the torque allocation arrangement is configured such that the torque demands to both the first and second motors reach their respective maximum torque limits when the total torque demand reaches the maximum limit.

7. A method of operating a dual motor drive assembly, the dual motor assembly comprising:
    a housing; a shaft rotatably mounted with respect to the housing; a first gear connected to and configured to rotate with the shaft; first and second motors, each having an output driving a respective output gear, the output gears being engaged with the first gear;
    wherein the method comprises the steps:
    (a) allocating torque demands to each of the first and second motors, wherein in a first mode the torque demand allocated to each of the motors is such that the motors are providing opposing torques to the shaft, and in a second mode the torque demand allocated to each of the motors is such that the motors are providing torques in the same direction to the shaft;
    (b) measuring or estimating a first temperature and a second temperature relating to the first and second motors respectively;
    (c) allocating a maximum torque limit to the first and second motors based on the first temperature and the second temperature respectively, wherein a maximum total torque is equal to the sum of the maximum torque limits of the first and second motors; and
    (d) changing from the first mode to the second mode at a threshold total torque value, wherein the threshold total torque value is adjusted based on the maximum total torque.

8. A dual motor drive assembly comprises:
    a housing:
    a shaft rotatably mounted with respect to the housing;
    a first gear connected to and configured to rotate with the shaft;
    first and second motors, each having an output driving a respective output gear, the output gears being engaged with the first gear;
    a torque allocation arrangement for allocating torque demands to each of the first and second motors;
    a measurement arrangement for measuring or estimating a first temperature and a second temperature relating to the first and second motors respectively;
    wherein in a first mode the torque demand allocated to each of the motors is such that the motors are providing opposing torques to the shaft, and in a second mode the torque demand allocated to each of the motors is such that the motors are providing torques in the same direction to the shaft; and
    wherein in the second mode, the first and second temperatures are compared to each other and/or to one or more pre-determined limits, and the torque demand allocated to each motor is adjusted based on the comparison so as to balance the temperature of the first and second motors.

9. A dual motor drive assembly according to claim 8 wherein under normal operating conditions, the torque demand allocations follow a baseline torque demand allocation scheme.

10. A dual motor drive assembly according to claim 9, wherein the first and second temperatures are compared to one or more pre-determined limits.

11. A dual motor drive assembly according to claim 10, wherein if neither the first and second temperatures exceed a pre-determined limit both temperatures compared, and/or if both the first and second temperatures exceed a pre-determined limit both temperatures are compared.

12. A dual motor drive assembly according to claim 8, wherein the first and second temperatures are compared to one or more pre-determined limits.

13. A dual motor drive assembly according to claim 8, wherein if neither the first and second temperatures exceed a pre-determined limit both temperatures compared, and/or if both the first and second temperatures exceed a pre-determined limit both temperatures are compared.

14. A dual motor drive assembly according to claim 13 wherein if the first temperature relating to the first motor is measured to be higher than the second temperature relating to the second motor, then for a given total torque demand in the second mode a higher torque demand may be allocated to the second motor and a lower torque demand may be allocated to the first motor, or vice versa, in comparison to the baseline torque allocation scheme.

15. A dual motor drive assembly according to claim 13 wherein demand torques of the first and second motors are allocated to balance the first and second temperatures in proportion to a temperature difference between the first and second temperatures.

16. A method of operating a dual motor drive assembly, the dual motor assembly comprising:
   a housing; a shaft rotatably mounted with respect to the housing; a first gear connected to and configured to rotate with the shaft; first and second motors, each having an output driving a respective output gear, the output gears being engaged with the first gear;
wherein the method comprises the steps:
   (a) allocating torque demands to each of the first and second motors; wherein in a first mode the torque demand allocated to each of the motors is such that the motors are providing opposing torques to the shaft, and in a second mode the torque demand allocated to each of the motors is such that the motors are providing torques in the same direction to the shaft;
   (b) measuring or estimating a first temperature and a second temperature relating to the first and second motors respectively;
   (c) comparing the first and second temperatures in the second mode, and adjusting the torque demand allocated to each motor based on the comparison so as to balance the temperature of the first and second motors.

* * * * *